Aug. 4, 1959     A. G. BODINE, JR     2,897,734
SONIC BEAM EARTH COMPACTING SYSTEM
Filed Sept. 21, 1956     3 Sheets-Sheet 2
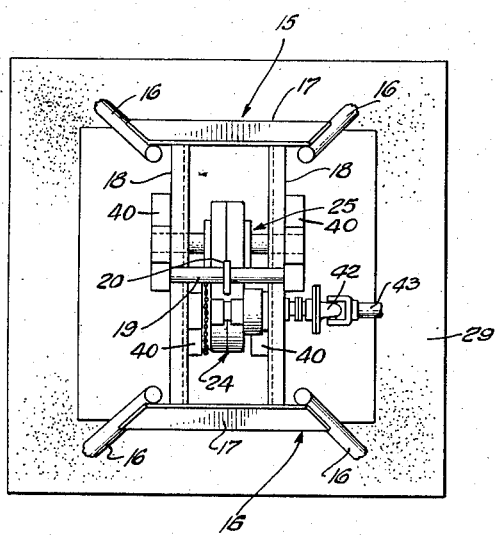
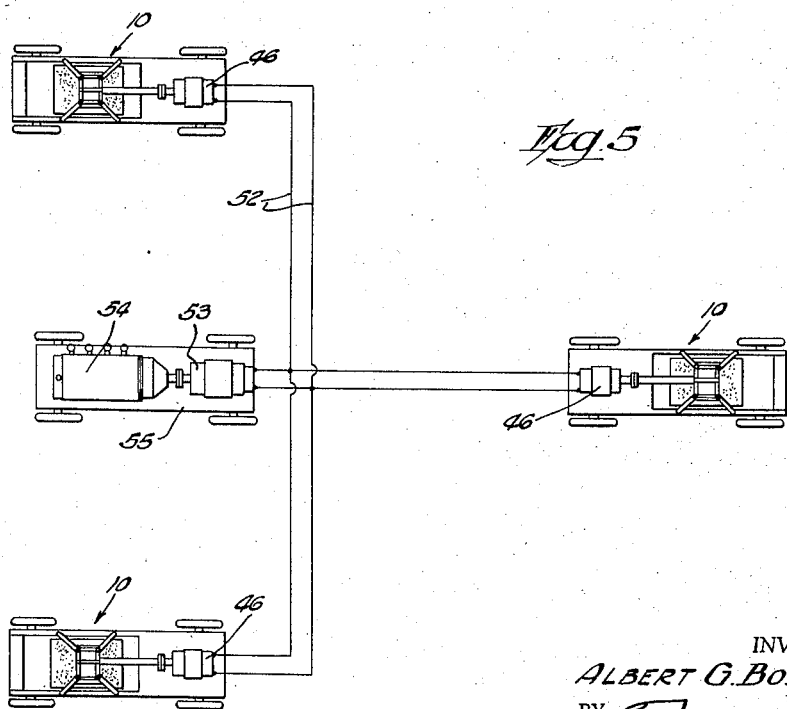
INVENTOR.
ALBERT G. BODINE, JR.
BY
ATTORNEY.

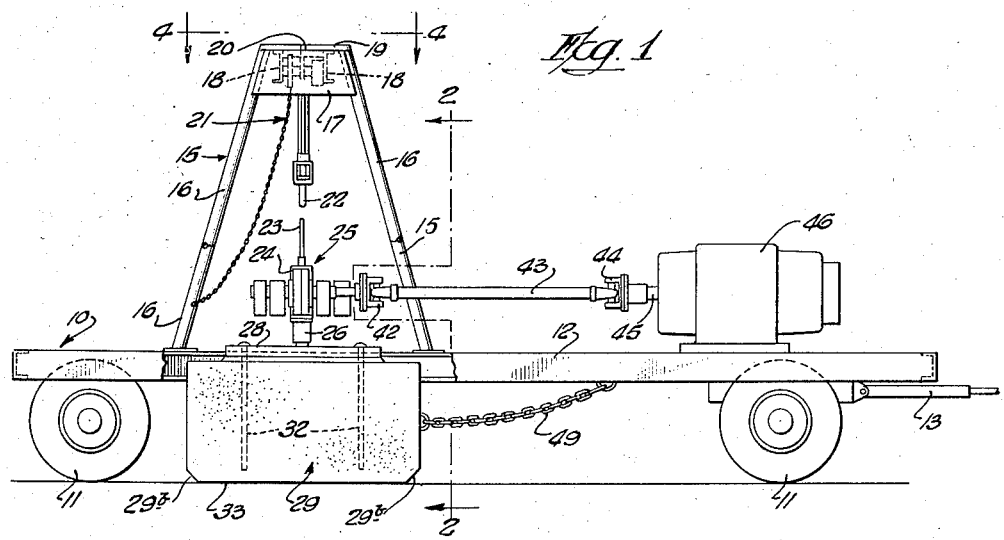
Fig. 1
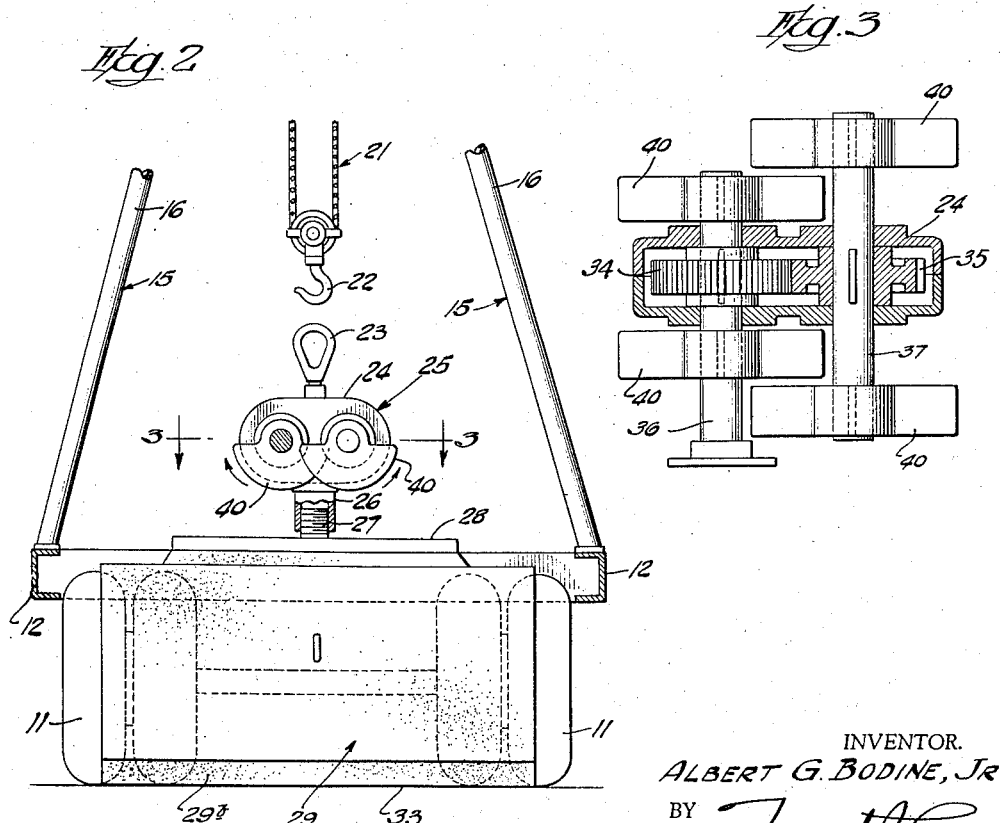
Fig. 2
Fig. 3
INVENTOR.
ALBERT G. BODINE, Jr.

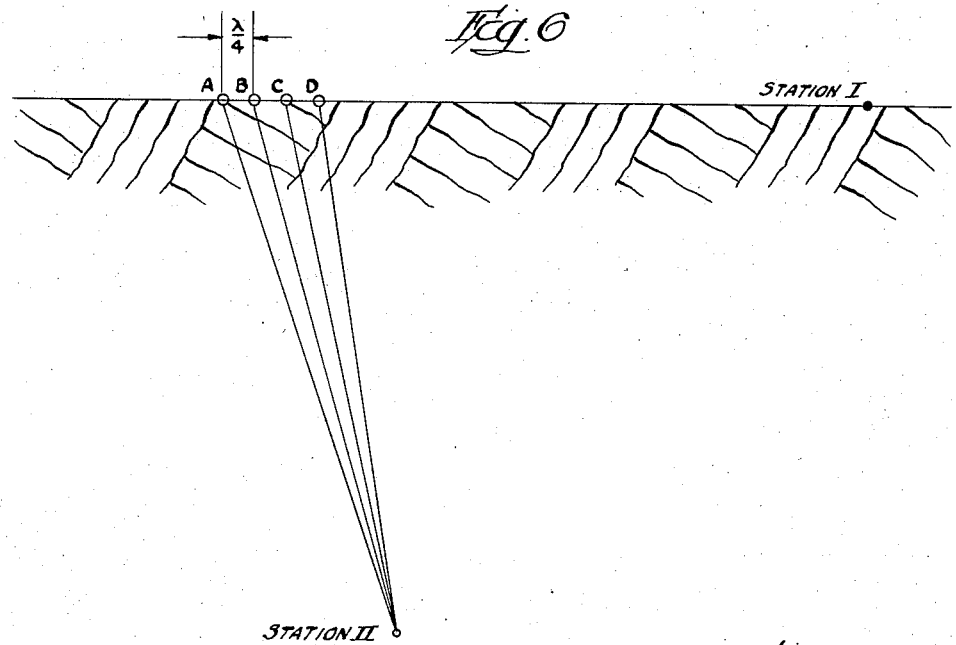
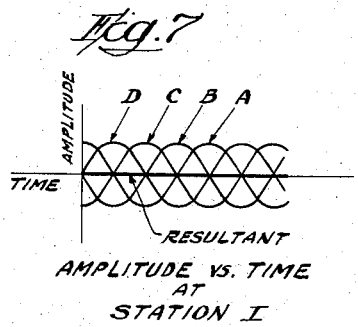
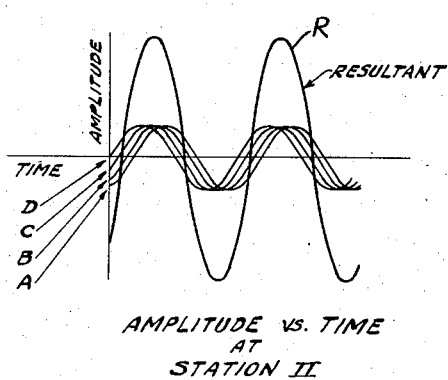
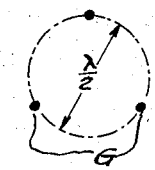
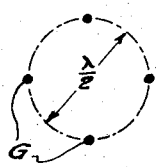

2,897,734
SONIC BEAM EARTH COMPACTING SYSTEM

Albert G. Bodine, Jr., Van Nuys, Calif.

Application September 21, 1956, Serial No. 611,163

2 Claims. (Cl. 94—22)

This invention relates generally to systems and apparatus for compacting earth, for use in such typical applications as providing solid earth foundations for airport runways, highways, bridge foundations, and the like, and the general object of the invention is the provision of a system and apparatus for compacting or tamping earth by use of compression waves transmitted through the earth. This application is a continuation-in-part of my copending application entitled System and Apparatus for Compacting Earth, Ser. No. 216,022, filed March 16, 1951 and now abandoned.

In accordance with the invention, there is provided an array of wave generators, each coupled to the earth for generating compressional waves therein, and these generators are synchronized and so spaced and arranged as to cooperate in the production of a compressional wave beam of substantially plane wave front projected downwardly in the earth. An individual earth coupled wave generator radiates a spherically fronted wave into the earth, wave energy being substantially uniform over a wave front throughout a spherical angle of 180°. A plurality of close spaced generators, covering an area whose maximum linear dimensions are a small fraction of a quarter wavelength of the generated wave in the earth, produces also a substantially spherically fronted wave, with wave energy distributed substantially uniformly throughout the 180° spherical wave front. In this connection, it will be understood that a wavelength distance in the earth is determined by the ratio of the velocity of elastic waves in the earth to the frequency of such waves. According to a simple illustrative example of the present invention, the spacing of the generators from one another on the earth's surface may be made to be at least substantially a quarter wavelength distance of a wave in the earth in the direction of wave propagation at the frequency of the wave, and the area of the array may have a linear dimension of at least substantially one-quarter wavelength. The waves from the generators then overlap. In addition, components of these overlapping waves otherwise propagated from this array in horizontal directions largely cancel one another by wave interference, while vertical components are additive and reinforce one another. The result is a concentrated vertically directed resultant wave beam, of substantially plane wave front, which may have some flare, but which is radiated essentially or primarily in the downward direction. Such a vertically concentrated compressional beam is especially effective in compacting the earth mass through which it is propagated. A point of utmost importance is that the non-useful and wasted energy of otherwise horizontally propagated wave components is conserved and added to the downwardly propagated beam. In other words, by the present invention, this otherwise useless laterally expended energy is conserved, and substantially the total power of the generators is available to the downwardly directed beam. In effect, the loading of the generators in the horizontal direction is largely removed, and the generators accordingly automatically accept increased loading in the vertical direction. By reason of the added energy thus made available to the vertical beam, the vibration amplitude in the vertical direction at a point in the earth in the path of the beam is of materially greater magnitude than would be indicated by multiplying the amplitude which would result from one generator operating alone, by the number of generators.

An individual wave generator and coupling means suitable to the practice of the invention may comprise a heavy mass rested firmly against the earth, so as to place the earth under an initial downward biasing pressure, together with a compressional wave generator mounted on this mass and operable to vibrate the mass against the earth. Compressional waves are thus generated or radiated into the earth's structure, traveling therein with the speed of sound in the earth mass. The downward biasing pressure exerted by the heavy mass provides an effective coupling between the wave generator and the earth; and as the earth is compacted and settles this heavy mass settles with it, so that the biasing force is maintained. The elastic compression waves so transmitted through the earth will be understood to involve local to and fro movements of earth particles, which movement reduces friction therebetween, and brings about a semi-fluid state permitting the earth to gradually settle under its own weight plus the weight of the heavy biasing or coupling mass on which the wave generator is mounted. As explained in the foregoing, a single generator so coupled to the earth radiates, however, a spherically fronted wave, and a plurality of such generators, spaced properly in accordance with the invention, is required to provide the desired vertically directed, augmented amplitude wave beam.

Continuing with a consideration of an individual wave generator, it is usually possible to find and operate at a natural frequency. Under such conditions, the stiffness reactance of the earth and the mass reactances of the earth and of the coupling mass become equal and vectorially opposed to one another, with resultant magnification of wave amplitude. The natural frequency at which this phenomenon is obtained depends upon certain features including the compactness of the earth, and hence rises gradually as the earth becomes more and more solid during the operation of the process. To preserve operation at natural frequency, accordingly, it is sometimes necessary to gradually increase the frequency with the progress of the process.

A suitable type of compressional wave generator may involve a pair of oppositely turning unbalanced weights, driven by a suitable engine or electric motor at the required natural frequency. Lateral components of vibration of these weights are balanced out, while their vertical components are additive, and are applied to the coupling mass. The invention provides further a suitable vehicle on which the equipment for a single generator, coupling mass, and engine or motor, may be conveniently transported, with the coupling mass elevated out of engagement with the earth. Means are provided for lowering the coupling mass and generator into proper engagement with the earth at the site selected for operation. The mass may be thus transported from location to location, or it may be dragged while in contact with the earth, even while the oscillator is operating.

The invention will be more fully understood from the following detailed description of illustrative apparatus in accordance therewith, reference being had to the accompanying drawings, in which:

Fig. 1 is a side elevation of a vehicle mounted earth coupling mass and vibration generator, together with power unit, in accordance with the invention;

Fig. 2 is a section taken on broken line 2—2 of Fig. 1;

Fig. 3 is a section taken on line 3—3 of Fig. 2;

Fig. 4 is a fragmentary plan view taken in accordance with arrows 4—4 on Fig. 1;

Fig. 5 is a schematic diagram showing an array of individual compactor units in accordance with the invention;

Fig. 6 is a diagram illustrative of the invention;

Figs. 7 and 8 are wave amplitude diagrams applying to the example of Fig. 6; and Figs. 9 and 10 are illustrative diagrams of modified arrays of wave generator stations.

In Figures 1 to 4, numeral 10 designates generally a truck having wheels 11, a frame including longitudinal channels 12, and a draw bar 13. Erected on channels 12 are a pair of A-frames 15, each comprising a pair of pipes 16 resting at their lower ends on the corresponding channel 12, and connected at the top by a gusset plate 17. Connecting the two gusset plates 17 are channels 18, and a transverse bar 19 resting on the top of channels 18 supports the upper hook 20 of a conventional chain lift 21. The lower hook 22 of chain lift 21 is adapted to engage an eye 23 connected to the top of housing 24 for elastic wave generator 25.

The bottom of generator housing 24 is mounted on a tubular coupling 26, into which is threaded a coupling pin 27 welded to the top of a steel plate 28 which carries heavy mass 29. The latter may be a large cast iron block, or a heavy block of concrete, having a typical weight of perhaps a ton. This block 29 may be secured to the steel plate 28 by means of anchor bolts 32, or otherwise as desired. It will be seen that the mass or massive block 29 is received between the two longitudinal frame channels 12, and has a flat bottom 33 adapted to engage the surface of the ground. Preferably, the front and rear lower edges of the black are bevelled as indicated at 29b, to facilitate sliding of the block along the earth if such should be desired. The block 29 rests on the ground, free of its suspension equipment, at all times during operation, but when the apparatus is to be transported, or moved to a new station of operation, the chain lift 21 may be operated to engage its hook with eye 23, and then to lift the block 29 by means of eye 23 and the generator housing until the block 29 is sufficiently clear of the ground for transportation.

The preferred wave generator 25 is of a type having oppositely rotating unbalanced weights which cancel out lateral components of unbalanced force, but whose vertical components of unbalanced force are additive to apply a substantial vertically directed alternating force to the plate 28 connected to the massive block 29. Thus, as here shown, generator housing 24 encloses a pair of meshing spur gears 34 and 35, which are mounted on shafts 36 and 37, respectively, journaled in the side walls of housing 24 (see Figure 3). The shafts 36 and 37 project oppositely from housing 24, and carry unbalanced weights 40, the weights carried by shaft 36 being located between the weights carried by the shaft 37, so as to avoid interference. Shaft 36 has a flexible universal joint coupling at 42 (Figure 1) with a transmission shaft 43, and the latter is driven through another flexible universal joint coupling 44 from the power shaft 45 of a driver, in this instance an electric motor 46.

As will be seen from the drawings, the weights 40 are so placed on shafts 36 and 37 that they will swing up and down in unison, so that the unbalanced forces generated by their rotation will be additive in the vertical direction. At the same time, the shafts 36 and 37, turning in opposite directions, cause horizontal components of force generated by the weights to cancel one another. Obviously, these results are obtained when the weights are all located on their shafts as illustrated in the drawings, that is to say, with the two weights of each pair at either side of the housing turning in opposite directions, and with all of the weights swinging up and down in unison. Powerful vertical force oscillations are generated by the device as described, and are applied directly to the plate 28 and massive block 29, while horizontal force components at the shafts are cancelled. With the massive block 29 in firm ground engagement, as shown in Figures 1 and 2, and the generator 25 driven by engine 46, vertical force oscillations are applied by the generator to the massive block 29, and by the block 29 to the underlying earth. Massive block 29, firmly resting on the earth, functions as an efficient wave coupling device, permitting effective generation of compressional waves traveling downwardly in the earth with the speed of sound. These compressional waves are propagated by longitudinally directed to and fro movements of the particles making up the earth's structure. These to and fro excursions of the earth particles result in a substantial reduction in friction therebetween, and the earth under the influence of these compression waves become semi-fluid, and capable of a progressive and relatively rapid settling action under the combined downward pressure exerted by the overlying earth and the coupling or biasing mass 29.

Typically, the generator 25 is driven by motor 46 at a speed to generate waves of a frequency of the order of 20 cycles per second, although this may vary substantially. In practice, it is nearly always possible to find a frequency at which an optimum rate of compacting is obtained, and this optimum condition usually signifies operation at natural frequency. Under such conditions, the stiffness reactance of the underlying vibrating earth structure is balanced by the mass reactances of the coupling weight 29 and vibrating earth, and a maximized amplitude of vibration is achieved, with resultant optimum wave amplitude in the earth, and optimum compacting rate. The natural frequency at which this phenomenon is obtained is easily found by varying the speed of the motor 46 until maximum vibration amplitude of the generator 25 is observed. It should be understood that the generator 25, as well as the block 29, will vibrate vertically through some fraction of an inch during the operation of the equipment, and as the natural frequency is approached, increased amplitude of vibration can readily be observed by the operator. It is only necessary, then, to adjust the speed of the prime mover until maximum vibration frequency is observed, signifying operation at natural frequency and maximized progress of the compacting process.

As stated in the introductory paragraphs hereof, the invention contemplates use of an array of the individual generators, operated synchronously and so spaced and arranged as to generate overlapping compressional waves, and to effect substantial cancellation of horizontal wave components of these waves while accomplishing reinforcement or augmentation of the vertical wave components thereof.

The phenomena of wave cancellation and reinforcement in the horizontal and vertical directions, respectively, is illustrated in the diagrams of Figs. 6–8, to which reference is now made. In the specific illustration given, four synchronized generators are located in alinement on the earth's surface at A, B, C and D (Fig. 6), spaced one quarter wavelength ($\gamma/4$) apart. The linear dimension of the array is thus three-quarters wavelength. At a station I located on the earth's surface at a considerable distance from A, B, C and D, the waves arriving from A, B, C and D have phase displacements of 90° owing to their quarter wavelength spacing along the direction line from A, B, C and D to I. The Wave Amplitude vs. Time diagram for station I (Fig. 7) reveals that the four waves arriving from A, B, C and D are at 90° phase difference from one another, and that the net amplitude of such four waves is zero. The waves from A and C totally interfere with and cancel one another, and the waves from B and D do the same. The cancelling effect with the array shown is at its optimum with the assumed spacing of $\gamma/4$.

Fig. 6 shows also a station II located deep in the earth, spaced only a short distance to one side of a perpendicular to the earth's surface passing through the array of generators A, B, C and D. It will be noted that the waves arriving at II from A, B, C, and D have only slight phase differences owing to small differences in distance from the several generators, A, B, C and D to the station II. The Wave Amplitude vs. Time diagram for station II (Fig. 8) shows the four waves from A, B, C and D to be displaced by only a slight phase angle, and hence to be additive to produce a resultant vertical wave R of large net amplitude.

Thus it will be seen that stations such as II at locations near the perpendicular to the earth's surface through the array of generators experience high resultant wave amplitude, yielding a vertically oriented directional beam of concentrated wave energy. In the central region of such beam, along the perpendicular, energy concentration is maximized, while owing to maximized wave interference in horizontally more remote regions, energy concentration is diminished or cancelled. The diminished wave energy in the outer regions of and around the beam represents a reduction of power load on the generators, which are thus enabled to furnish increased power to the vertically directed beam. Accordingly, vibration amplitude in the central region of the beam actually attains a value materially greater than is indicated by the simple product obtained by multiplying the energy output from a single generator used alone by the number of generators. The diagrams of Figs. 6-8 may also be taken to illustrate half wave spaced generators. Assume, for example, that generator stations A and C are omitted, using only the two remaining stations B and D, which will be seen to be at half wavelength spacing. It will be seen that the corresponding horizontally propagated waves at station I are equal and opposed, and hence cancel; while at station II, the vertically propagated waves are additive to produce a nearly double amplitude resultant.

Of course, the simple illustrative examples based on Figs. 6-8 employ a linear array of generators, rather than a two-dimensional or area defining array, and for such simple example, wave cancellation is effective only in directions parallel with the linear array. In actual practice, two dimensional, or area-defining arrays, are generally employed, giving two dimensional horizontal wave cancellation, i.e., in a horizontal plane, in combination with wave reinforcement and augmentation in the vertical direction. Many such area defining arrays are practicable, employing from three to a substantial number of individual generators. In general, and within evident reasonable limitations, the larger the linear dimensions of the array area, the straighter and more concentrated will be the resultant vertically directed beam. Of course, practical considerations limit the number of wave generators feasible for a given field of operation, and about four generators is deemed the maximum number, or nearly so, that is likely to be practically feasible for a given field operation, though in theory a larger number would permit the accomplishment of an even better vertical beam effect. It is found in practice that a circular array is highly effective, using three or four generators equally spaced on a circle whose diameter, for optimum performance, is equal to a half wavelength, or any odd multiple thereof.

In Figure 5, three of the motor driven wave generators have been arranged at equal spacing over an area of the earth's surface to be compacted. These generators may be typically arranged with a spacing distance therebetween equal to substantially a quarter wavelength, or more, of the wave generated in the earth. Thus assuming a wave frequency of 20 cycles per second, and a wave velocity in the surface earth material of 500 to 4,000 feet per second (which are about the outside conditions, depending upon local earth make-up), a wavelength would be 50 to 200 feet, and the wave generators should then be spaced a minimum of from 12.5 to 50 feet apart, as the case may be. The electric drive motors 46 of the several units are energized by means of power leads 52 fed from a generator 53 driven by an internal combustion engine prime mover 54, generator 53 and prime mover 54 being here shown as mounted on a portable generator truck 55. Speed control of the motors, to enable operation at resonance, as heretofore mentioned, may be easily effected by regulation of the output voltage or frequency of generator 53. Of course, if power is available at the site, the leads 52 may be fed from commercial power mains.

The several wave generators are operated in synchronism with one another, with the unbalanced weights of all generators swinging up and down in unison. This is readily accomplished in any one of several ways, for instance by employing two pole synchronous motors. The unbalanced weights of all of the generators will naturally come to stop at the bottoms of their strokes, so that they will initially pick up together, and by employing two pole synchronous motors, assurance is had that they will continue to operate in unison with one another.

The described synchronous operation of the several compactors, arrayed as indicated hereinabove, results in the propagation of a vertical plane-fronted compressional wave beam downward to very substantial depths in the earth. The wave energy is more concentrated, penetration is deeper, and an entire area of the field to be solidified is set into a uniform longitudinal compressional wave motion. Solidifying under these conditions proceeds very rapidly.

Figs. 9 and 10 are diagrams of modified generator arrays in accordance with the invention, showing, respectively, three and four synchronized seismic wave generators G, in each instance in a circular array one-half wavelength in diameter. In general, when the generators are close spaced relative to a quarter wavelength, their wave components in both the horizontal and vertical directions will be essentially additive. As the generators are spread apart horizontally, wave interference in the horizontal direction increasingly occurs, and becomes material in the region of quarter wave spacing, and total, or optimized, at half wave spacing. Wave interference is also total, or optimized, at any odd multiple of half wavelength spacing. The generator array may, of course, be of various configurations within the broad scope of the invention. Thus, the generators may lie, at equal spacing, on a circle, or on an ellipse, or may form a rectangular figure. In any case, the array area should have a minimum linear breadth dimension (diameter, in the case of a circle) at least equal to substantially a quarter wavelength, and preferably, for maximized vertical beam concentration effect, approximately a half wavelength, or odd multiple of the latter. Generator spacing has been defined as necessarily approximately $\lambda/4$ or greater, to attain material beam effect. No theoretical maximum spacing exists. Practically, either for two individual generator stations, or for the maximum linear dimension of the generator array area, an outside limit of about 500 feet is deemed to be reasonable.

Further, as preliminarily described in the introductory portion hereof, it is usually possible to find and operate at a natural frequency, at which the stiffness reactance of the earth equals and vectorially opposes the mass reactance of the earth and of the coupling mass, with the result that the magnitude of wave amplitude is amplified. The natural frequency generally tends to rise with increasing compactness of the earth, and the process of the invention accordingly contemplates, as a further step, the maintenance of operation at natural frequency by gradually increasing the frequency of wave generation as the earth is progressively compacted.

The invention has now been disclosed by way of certain present illustrative forms of apparatus. It is to be understood that this disclosure is for illustrative pur-

I claim:

1. In a method of compacting earth, the steps of: independently coupling a plurality of compressional wave generators to the earth to be compacted, operating each of said generators at a natural frequency of the generator and earth when so coupled whereby to generate compressional waves and propagate said waves through the earth, maintaining the individual generators at substantially the same frequency, so that the individual compressional waves originating from the generators are capable of coaction as components of a resultant compressional wave pattern, establishing a compressional wave amplitude, generator spacing and generator phase relationship at which the compressional waves from the individual generators overlap and coact to form a downwardly directed resultant compressional wave beam whose wave pattern is of greater amplitude than that of a single compressional wave from a single generator, and moving said plurality of generators progressively over successive areas of the earth to be compacted so that said successive areas are successively subjected to such resultant compressional wave beam.

2. The subject matter of claim 1, wherein there are at least three of the compressional wave generators in an area defining array.

References Cited in the file of this patent

UNITED STATES PATENTS

| | | |
|---|---|---|
| 1,955,101 | Sloan | Apr. 17, 1934 |
| 2,039,078 | Hertwig | Apr. 28, 1936 |
| 2,466,822 | Pollitz | Apr. 12, 1949 |
| 2,633,781 | Day | Apr. 7, 1953 |
| 2,636,719 | O'Connor | Apr. 28, 1953 |
| 2,757,588 | Pollitz | Aug. 7, 1956 |

FOREIGN PATENTS

| | | |
|---|---|---|
| 822,979 | Germany | Nov. 29, 1951 |
| 884,374 | Germany | July 27, 1953 |
| 737,432 | Great Britain | Sept. 28, 1955 |

OTHER REFERENCES

"Highway Investigation by Means of Induced Vibration," by R. K. Bernhard, published October 2, 1939.

"Earth Waves," by L. Don Leet, published in 1950 by John Wiley and Sons, Inc., New York (chapter II, pp. 38–57 and pp. 36, 37, 91, 95 and 96 relied upon).

Roads & Streets (magazine), published September 1956, pp. 144 and 145.

The Pennsylvania State College Bulletin, Engineering Experiment Station Series, Bulletin No. 49.